United States Patent [19]

McSherry et al.

[11] 4,075,924

[45] Feb. 28, 1978

[54] ANCHOR ASSEMBLY FOR FASTENER

[75] Inventors: Thomas W. McSherry, Bay Shore; Allan Thaw, Massapequa, both of N.Y.

[73] Assignee: Mechanical Plastics Corporation, Farmingdale, N.Y.

[21] Appl. No.: 686,323

[22] Filed: May 14, 1976

[51] Int. Cl.² .................. F16B 21/00; F16B 13/06
[52] U.S. Cl. ........................... 85/3 R; 85/71; 85/72; 85/80; 151/41.7
[58] Field of Search ............... 85/3 R, 7, 3 S, 4, 3 K, 85/72, 71, 80, 81, 32 K; 151/41.74, 41.7, 41.75

[56] References Cited

U.S. PATENT DOCUMENTS

| 670,922 | 3/1901 | Marquardt | 85/71 |
|---|---|---|---|
| 860,636 | 7/1907 | Church | 151/41.7 |
| 1,506,123 | 8/1924 | Hubener | 85/3 K |
| 1,521,025 | 12/1924 | Hubener | 151/41.7 |
| 2,398,220 | 4/1946 | Gelpcke | 85/3 K |
| 2,797,605 | 7/1957 | Metze et al. | 85/4 |
| 2,998,743 | 9/1961 | Apfelzweig | 85/3 R |
| 3,211,042 | 10/1965 | Fischer | 85/3 R |
| 3,532,024 | 10/1970 | Gutshall | 85/3 R |
| 3,605,547 | 9/1971 | Millet | 85/3 S |
| 3,651,734 | 3/1972 | McSherry | 85/80 |

Primary Examiner—Marion Parsons, Jr.

Attorney, Agent, or Firm—Pennie & Edmonds

[57] ABSTRACT

An anchor assembly for retaining an elongated fastener member within an opening defined by a wall portion of finite thickness and having at least one concealed side. The assembly has at least two elongated leg members of flexible material positioned in parallel relation to each other, with means connecting a pair of adjacent end portions of the leg members together. A generally elongated anchor member is positioned transversely of the leg members and attached to the opposite end portions thereof, the anchor member defining an opening generally medial of the leg members and capable of receiving an elongated fastener member for attachment therewith when the fastener member is positioned between the leg members. Means to connect an end portion of each leg member to the anchor member is provided for each leg member and the leg members and the anchor member connecting means including resilient means associated therewith to bias the anchor member toward its transverse position relative to the leg members against forces tending to rotate the anchor member toward a generally parallel orientation with the leg members, and control of the orientation and position of the anchor member behind the concealed surface of the wall is thereby facilitated by the application of forces either directly or indirectly to the leg members.

30 Claims, 21 Drawing Figures

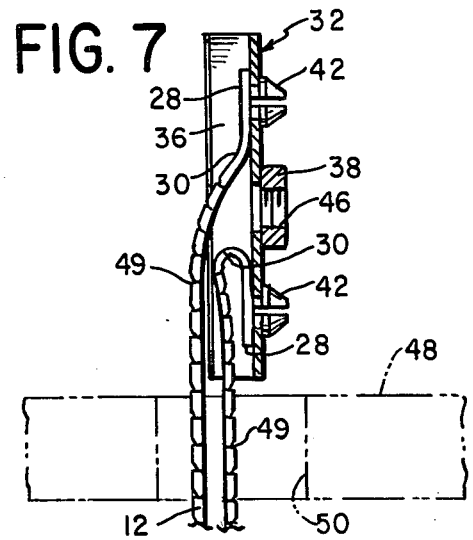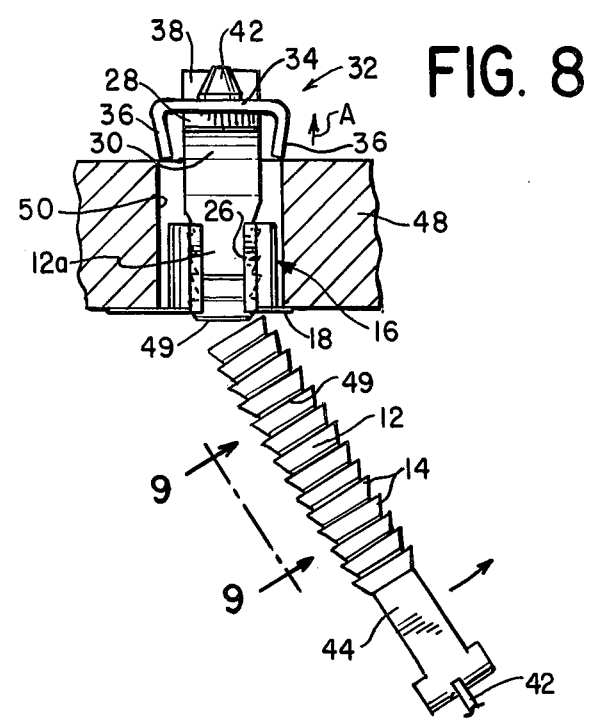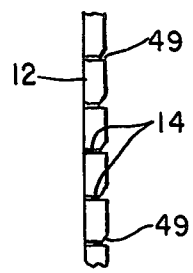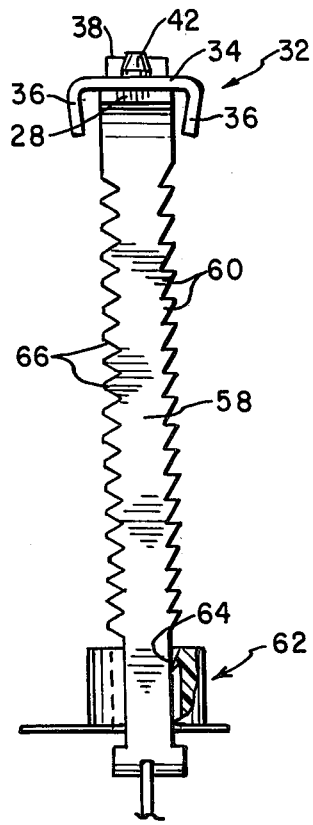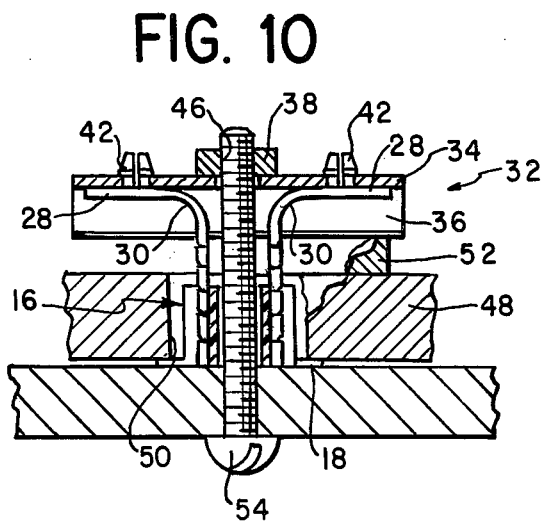

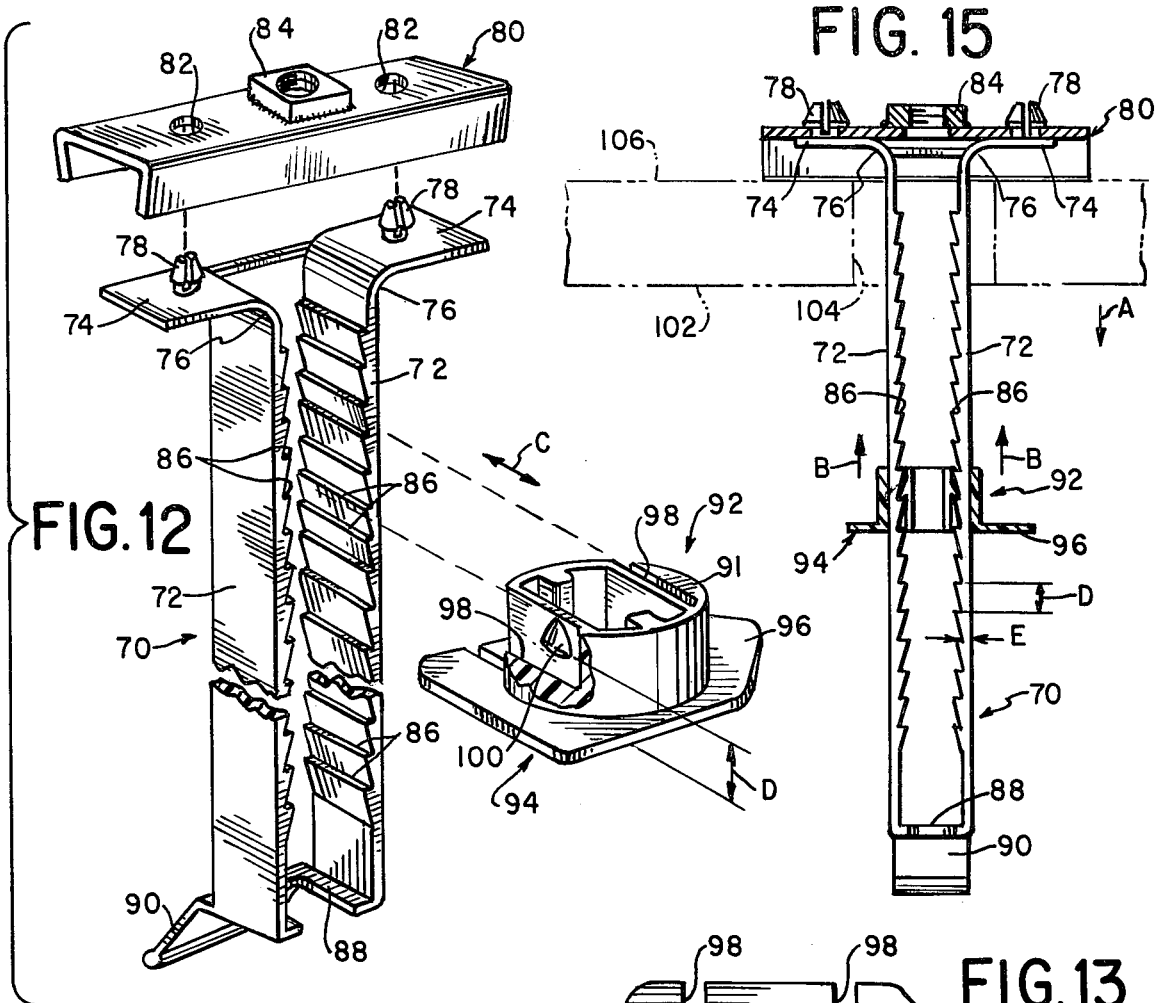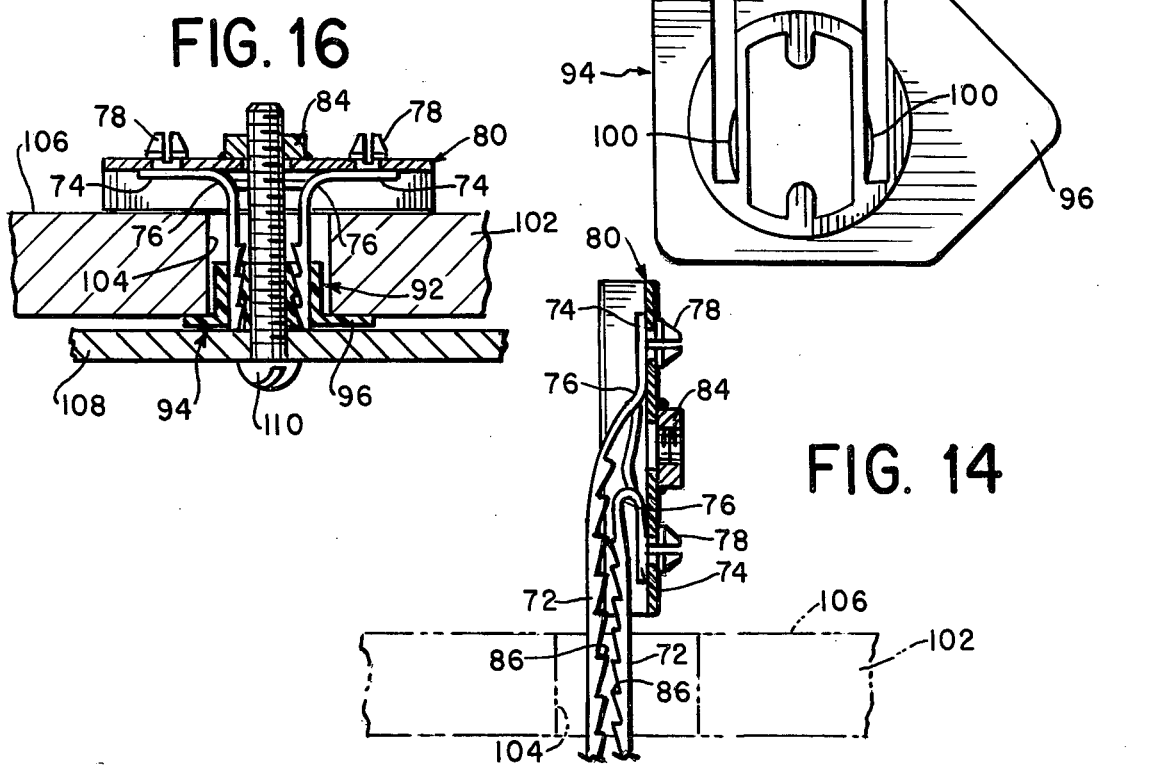

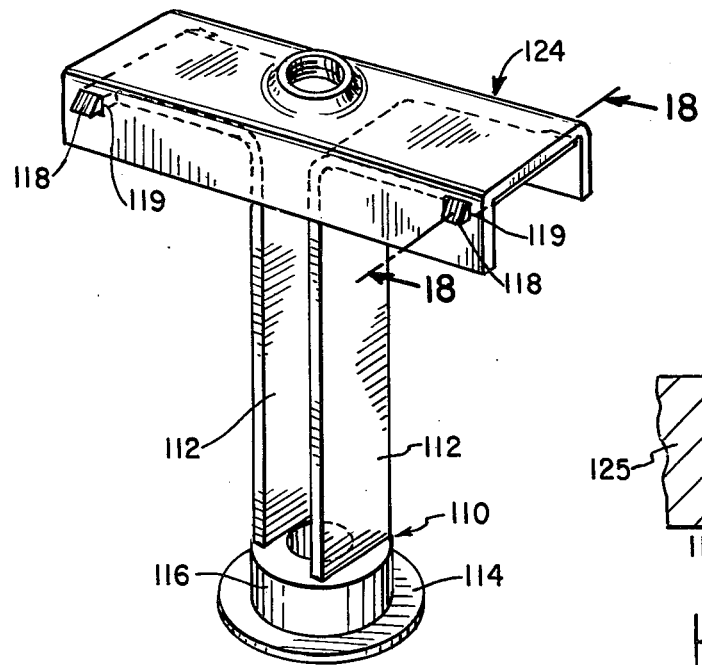
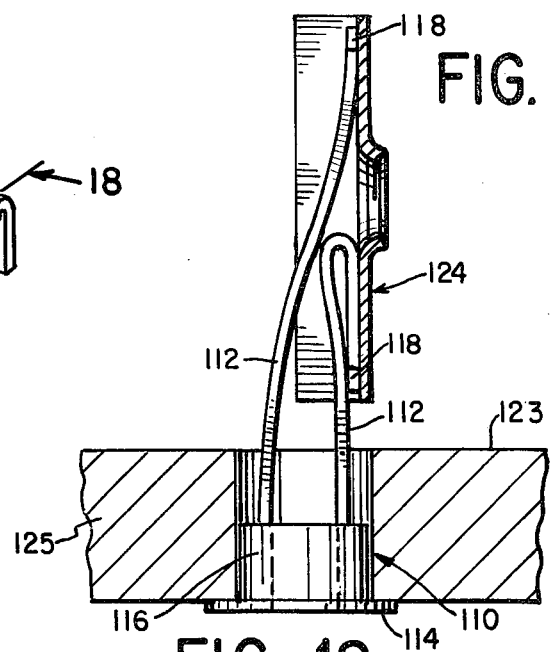
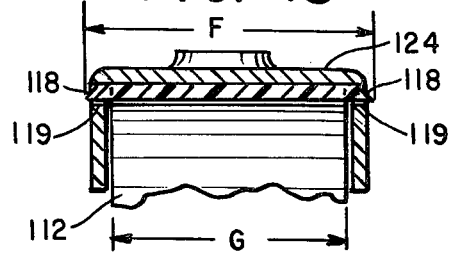
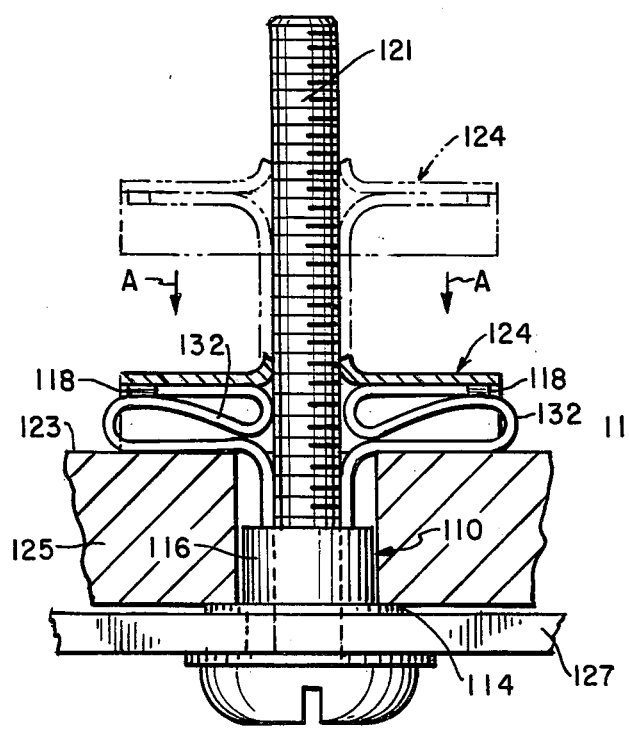
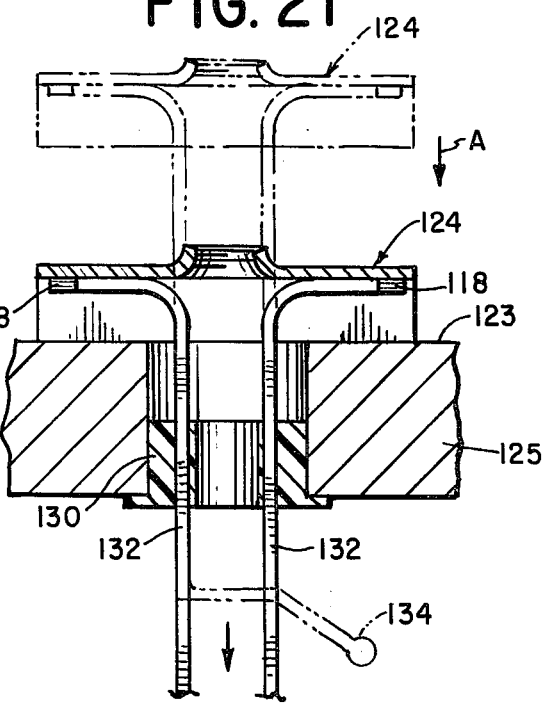

ANCHOR ASSEMBLY FOR FASTENER

BACKGROUND OF THE INVENTION

1. Field of the Invention

This invention relates to blind anchoring devices for fastening objects to hallow walls of plasterboard, masonry, brick and the like with elongated fastener members such as screws, bolts, and the like.

2. Description of the Prior Art

It is generally known that modern day building construction techniques have been increasingly directed toward the use of wallboard panels to construct walls and partitions. Such panels may be constructed of gypsum or plaster-related materials, or of finished wood or synthetic plastics constructed to simulate material wood, for example. The wallboard materials which are often used to construct basic wall structures in place of plaster walls of the prior art are commonly referred to as dry wall, gypsum board, plasterboard, etc. Certain of these materials are marketed under trademarks such as SHEETROCK®brand panels by the United States Gypsum Company of Chicago, Illinois. These wallboards are generally secured to studs which are suitably spaced according to local building codes and finished by suitable finishing techniques utilizing, for example, a tape material, plaster of paris and the like to seal the seams, and paint, wallpaper and the like for decorative purposes.

Although the relatively solid walls of the prior art were somewhat "hollow" in character, nevertheless the modern construction techniques provide walls or structures which have relatively increased "hollow" character because: (1) they are of lesser structural thickness; (2) structural intermediate materials such as wire lath and wood lath have been eliminated; and (3) they provide a relatively increased void space between the studding or other basic structure. Other well known construction materials which result in such "hollow" walls include concrete — cast and precast — cement, and cinder block, brick, etc.

The relatively massive construction of the earlier walls rendered them capable of supporting relatively heavy objects and substantial forces by utilizing relatively uncomplicated fasteners which relied on nails, screws and the like to complete attachment to these structures. In addition, with such earlier walls and fasteners, the higher concentration of loads resulted in greater forces-per-unit-area and did not have significant adverse affects on the walls because the substantial wall structures were capable of bearing such loads.

With the increasing use of the more hollow modern construction, it became increasingly apparent that — without a significant design change in wall fasteners 13 the new construction would not support the objects and loads in the same manner as the earlier arrangements. For example, in a wall constructed of plasterboard sheets secured to wood studs spaced 16 inches apart, the fasteners of the prior art could only be utilized at locations corresponding to the studs. Attachments to the plasterboard portion between the studs were difficult and — if accomplished — almost always pierced the wallboard and were incapable of sustaining any substantial loads for any length of time.

Such disadvantages of the modern hollow walls were inconsistent with the fact that in all other respects they were either equivalent to, or better than the more costly, relatively bulky construction of the prior art.

The need for blind wall fasteners which would increase the force distribution on the wall became evident, particularly where force distribution and high load-carrying capability was desirable and where attachment of the fastener to the wall could be accomplished with full access provided from one direction and limited or no access provided from the other direction. The number of such fasteners which could be utilized with such wallboards are legion. However, to date there are no fasteners which successfully eliminate the disadvantages of the prior art while offering relatively inexpensive, uncomplicated construction.

U.S. Pat. No. 3,211,042 to Fischer relates to a pivotal anchoring assembly for screws and the like in which a single extension has connected at one end a fastener retaining means and, at the opposite end, a knob. The construction does not facilitate positive or even substantial blind control of the fastener components when they are inserted into a wall opening, as is generally required in modern day construction, particularly at mass production construction sites. Further, the device of Fischer does not provide the positive attachment which is also desirable ana — in many cases — necessary in modern day construction.

U.S. Pat. No. 2,998,743 to Apfelzweig relates to a toggle bolt having a channel member which defines generally oppositely positioned U-shaped slots for reception of resilient sheet metal arms therein. The sheet metal arms are connected to one end to a washer which acts as a terminal head of the toggle bolt. When the channel member is inserted into a wall opening and positioned behind the concealed wall surface, fastening is accomplished in a well known manner by inserting a threaded member through the washer head and threadedly engaging a mating threaded opening of the channel member. This begins the movement of the channel member as it advances toward the blind surface of the wall along the length of the threaded fastener as it is rotated. The metal construction and the relatively rigid complex structure of this toggle bolt render it relatively difficult to produce and substantially more complicated to operate than would otherwise be desirable.

U.S. Pat. No. 2,398,220 to Gekpcke relates to a toggle lock which utilizes a pair of wings on the blind side of the wall to maintain the fastening effect. However, the wall fastening is primarily dependent upon the fastener bolt or screw remaining in position, and the basic wall attachment is not capable of being fastened to the wall as positively and securely as may be desirable. Further, the indirect control over the locking wings positioned behind the wall, from a position forward of the wall, is relatively negligible once direct control is relinquished.

U.S. Pat. No. 3,175,452 to Leitner relates to a fastening means adapted for connecting members whose rear sides are inaccessible. The structure of the Leitner device is directed toward a unitary blind bolt construction in which is provided a resilient extension for the purpose of positioning a threaded nut behind the concealed surface of the wall.

U.S. Pat. No. 3,552,258 to Warner relates to bolt anchors for attainment within a borehole of a rock or the like. Although the anchor contemplates a blind fastening attachment, the structure disclosed is neither adaptable nor useful to promote the type of blind fastening capability and control as is provided in the present invention.

A particularly useful development is disclosed in U.S. Pat. No. 3,651,734 to McSherry which relates to an expansible fastener engageable with one end of an opening and having an expandable overcenter toggle lock on the other side of the opening to maintain the fastener in stable overcenter position within a hollow wall opening. While this development has proven to be extremely useful and successful, a particularly dimensioned construction is adaptable for attachment with wallboards of a relatively limited range of thicknesses.

U.S. Pat. No. 1,521,026 to Hubener relates to an anchor bolt adapted for blind fastening by utilizing resilient means such as rubber bands to retain the tension on a resilient pull member.

This, it can be observed that while numerous constructions of the prior art fasteners have often relied upon the bolt, screw or other fasteners to retain their position within the wall, none of these fasteners is capable of being securely positioned on the wall generally independently of the elongated fastener. In addition, modern construction techniques have dictated new requirements necessitating greater blind control and more positive and quick fastening capability and installation than is possible with the earlier anchor bolts. We have invented a fastener which avoids the disadvantages of the prior art and is particularly useful with walls of numerous thicknesses wherein full access is generally provided from one direction. Our fastener has proven to be particularly successful for permanent and reusable attachment to modern wall constructions wherein ready access to one side is fully provided, and limited or no access is provided from a second side. The present construction is universally adaptable for use with walls of numerous types, including walls constructed of panels, cement, concrete, brick and the like. Further, a single fastener has particular utility with walls of numerous thicknesses and provides a permanent, reusable fastener with such walls.

SUMMARY OF THE INVENTION

The invention relates to an anchor assembly for retaining an elongated fastener member within an opening defined by a wall portion having at least one concealed side. The assembly comprises at least two elongated leg members of flexible material positioned in generally parallel relation with means connecting a pair of adjacent end portions of the leg members. A generally elongated anchor member is positioned transversely of the leg members at the opposite end portions thereof and defines an opening generally medial of the leg members and capable of receiving an elongated fastener member positioned between the leg members. The assembly further comprises means to connect an end portion of each leg member to the anchor member. The leg members and the anchor member connecting means have resilient means associated therewith to bias the anchor member toward its transverse position relative to the leg members against forces which tend to rotate the anchor member toward a generally parallel orientation with the leg members, and control of the orientation and position of the anchor member behind a concealed wall portion is facilitated by forces applied to said leg members.

A collar member is provided as part of the preferred assembly to fix the position of the leg members at the outer surface of the wall portion defining the opening in which portions of the leg members may be positioned. In the preferred embodiments, the collar member is further structured to include teeth members which are engageable with mating teeth members provided on the leg members to permit the collar member to be moved along the leg members toward the wall while the respective teeth are engaged and disengaged in a ratchet-like fashion. However, movement of the collar member in the opposite direction is prevented by the relative configurations of the mating teeth on the leg members and the collar member.

Although the need for the present invention was prompted largely by the increasing use of such construction materials as wallboards, plasterboard, gypsum board and the like, its significant ultilitarian advantages reside at least in part in the improved blind control which is facilitated by the structural arrangements thereof. Thus, it has been found that in addition to providing increased force distribution with such wallboard panels which are generally not structurally capable of supporting high concentrated forces, the present invention is extremely useful with all walls which usually are fully accessible from one direction but have limited or no access from the other. Such structural walls of concrete, brick, cinder blocks, cement blocks and the like are structures with which the present fasteners have been found to be particularly useful. Further, these structures usually require fasteners of substantial strength, a property which is found in the fasteners of the present invention.

The present invention provides a unique blind control agreement which renders the assembly quite simple to install and in less time than heretofore known with fasteners of the prior art. It is particularly useful at mass production construction sites where it is desirable to have numerous fasteners installed in position as part of the prime structure even though neither the particular elongated fastener (threaded or unthreaded) nor the wall object is installed at the same time. The desirability of such a device is particularly underscored by the fact that most of the fasteners of the prior art relied upon an elongated fastener such as a screw or bolt to actually retain the entire device in position on the wall and were not generally capable of secured installation independently of the screw or bolt.

The present invention combines resilience with rigidity to render it particularly useful with wall sections having uneven or discontinuous blind surfaces. For example, in the case of plasterboard walls, drilling an openng for installation of a blind fastener would normally result in spalling of the material whereby a section or chip of plaster breaks away from the main board and remains at or adjacent the periphery of the opening on the blind side of the wall. For concrete or cement walls, cement overflow, excess cement at the joints, or even cratering during the drilling of an opening will often create an uneven surface surrounding an opening. In either of these exemplary situations, reliance upon a threaded anchor member of the prior art type to retain its proper orientation for reception of a threaded fastener member was futile since these obstructions prevented the anchor member from assuming uniform contacting relation with the blind surface of the wall. The combination of resilience with a sufficient degree of rigidity in the present invention causes the anchor member to retain a basic parallel relation with the plane of the wall.

In the preferred embodiment of the present invention, the elongated anchor member is constructed of plate steel having a channel-like cross-sectional configuration to provide a suitable force distribution and a substantial total force-carrying capability. The channel member includes a central opening preferably having a tapered cross-section to provide a guide for an elongated fastener member inserted into the wall. Where the elongated fastener is threaded, as in the preferred embodiment, a nut is attached by bonding, spot-welding, butt welding or otherwise to the central plate of the channel member to provide threads adjacent the opening for reception of the threaded fastener.

It has been found that with the preferred embodiment, the channel-like cross-sectional configuration is advantageously constructed to resist substantial loads by inclining the channel flanges toward each other to assume an angular relation somewhat less than a perpendicular with the central plate. This arrangement causes the flange members to withstand forces which would otherwise cause them to spread away from each other. With substantial fastening forces as, for example, for concrete wall applications, the flange members will ultimately fold toward the central plate member. It has been found that such channel members constructed of plate steel of, say 0.050 inch withstand compressive forces of up to 1500 pounds utilizing a threaded fastener bolt of ¼-inch diameter. With such forces, the flange members of the channel member ultimately assume a completely folded configuration, with the effect that the channel member becomes deformed into a dual layer steel plate abutted against the blind surface of the wall.

An alternate construction for the channel member may include flange members which are perpendicular to the central plate, but this configuration is useful in applications requiring less than substantial loads. In addition, a particularly useful alternate threading arrangement for the central opening of the channel member is disclosed whereby a central opening is provided in the central plate of the anchor member and is initially dimpled (or funneled). Thereafter, the central opening is threaded. The funneling not only increases the material within the opening to be subjected to threading but additionally has been found to provide a unique guiding means for a threaded fastener such as a bolt which is often difficult to insert properly into a threaded blind environment.

Other advantages and features of the present invention will become readily apparent to those skilled in the art from the description which follows.

BRIEF DESCRIPTION OF THE DRAWINGS

Preferred embodiments of the invention are described hereinbelow with reference to the drawings wherein:

FIG. 7 is a view, partially in cross-section, of the anchor assembly positioned for attachment to a hollow wall;

FIG. 8 is a view, partially in cross-section, of the attachment of FIG. 7, with excess leg portions being removed;

FIG. 9 is a front view of a portion of a leg member taken along lines 9—9 of FIG. 8;

FIG. 10 is a view, partially in cross-section, of the inventive anchor member securing an object to a wall portion;

FIG. 11 is a side view of the leg members of the anchor assembly illustrating an alternate feature thereof;

FIG. 12 is a perspective view from above of a second embodiment of the invention;

FIG. 13 is a top plan view of the collar member of the anchor assembly of FIG. 11;

FIG. 14 is a side view, partially in cross-section, of the anchor assembly of FIG. 12 positioned for attachment to a hollow wall;

FIG. 15 is a view of the anchor assembly of FIG. 12; with the collar member in position about the leg members;

FIG. 16 is a view, partially in cross-section, of the completed attachment of FIG. 12;

FIG. 17 is a perspective view of a third embodiment of the anchor assembly;

FIG. 18 is a cross-sectional view taken along lines 18—18 of FIG. 17;

FIG. 19 is a side view, partially in cross-section, of the anchor assembly of FIG. 17 positioned for attachment to a hollow wall;

FIG. 20 is a view, partially in cross-section, of the anchor member of FIG. 17 attached to a hollow wall; and FIG. 21 is a view, partially in cross-section, of the anchor assembly of FIG. 17 illustrating an alternate feature thereof.

DETAILED DESCRIPTION OF THE PREFERRED EMBODIMENT

For the purpose of the description which follows, where components are symmetrical, like parts are identically numbered. For purposes of description, the references to "hollow walls" contemplate walls constructed of such well known modern construction materials as dry wall, gypsum board, plasterboard, SHEETROCK[200], wood and synthetic panels and the like which are generally secured to beams, studs, etc. suitably spaced as required by local building codes. In addition, such hollow walls include structures of concrete, cast and precast, cinder and cement blocks, brick, etc., of the type utilized in modern construction.

Figure 1:
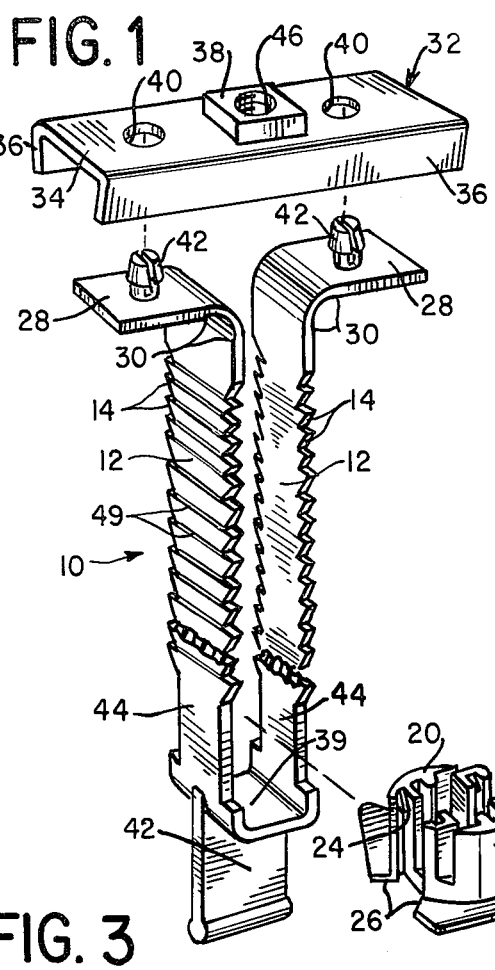
FIG. 1 is a perspective view from above of the preferred embodiment of the blind anchor assembly of the invention.

Referring initially to FIG. 1, there is illustrated a blind anchor fastener constructed according to the present invention, with its component parts shown separately for the purposes of the description. Anchor assembly 10 is constructed of elongated legs 12 of a flexible material. The legs 12 are constructed of a flexible resilient plastic material such as polypropylene, polyethylene, nylon and the like, and have opposite serrated marginal edge portions comprised of a plurality of adjacent teeth 14 as shown.

A collar 16 is comprised of a generally planar base 18 having flanges 20 extending upwardly therefrom as shown in FIG. 1. These flanges 20 and the base 18 are constructed integrally and are preferably of the same resilient material as the leg members. Thus, the connection of flanges 20 to the base 18 are resiliently flexible, and the individual flange portions are flexible. This provides an advantage which will become evident in the description which follows.

Figure 5:
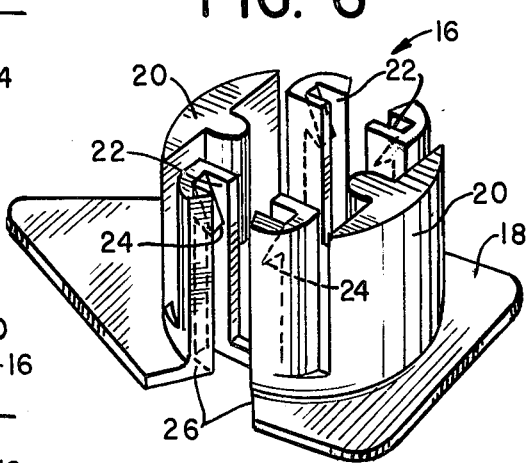
FIG. 5 is a side view, partially cut away, of the collar member of FIG. 4.

The upstanding flanges 20 define slots 22 within which are provided oppositely positioned teeth members 24 preferably configured as shown in the cutaway view of FIG. 5. The slots 22 communicate with tapered channels 26 which conveniently guide the leg members 12 toward the slots 22 for the purpose of completing the assembly of the collar 16 and the legs 12.

Figure 2:
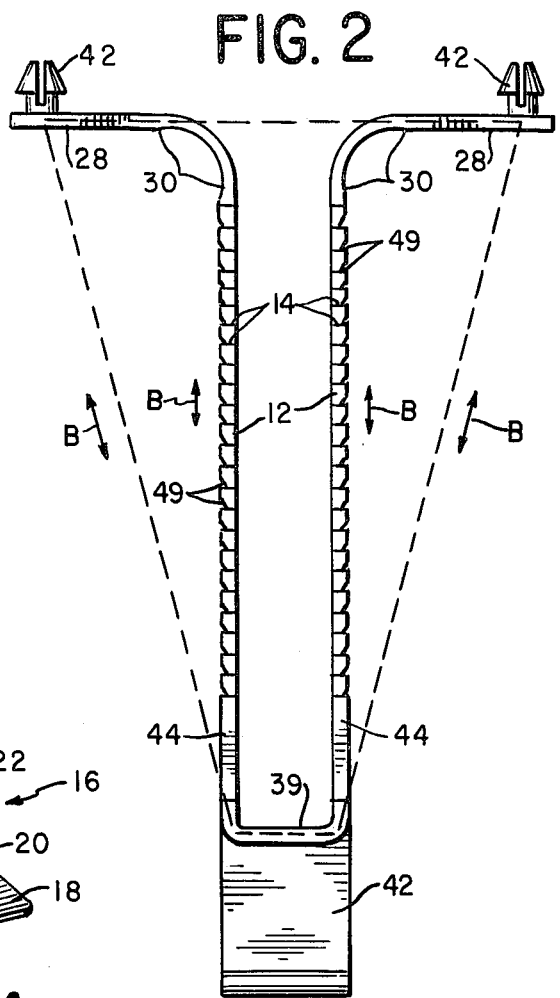
FIG. 2 is a front elevational view of the leg members thereof.

Referring further to FIG. 1, in conjunction with FIG. 2, upper end portions 28 of leg members 12 are integrally connected thereto by arcuate portions 30 to form bent leg connectors. These arcuately configured leg portions combine with the flexible and resilient character of the plastic material of the legs 12 to provide stabilizing forces which retain the relative desired orientation and position of the members of the anchor assembly when it is positioned within a hollow wall.

Referring further to FIG. 1, an anchor member 32 of metal construction has a channel-like cross-sectional configuration with a central plate section 34 and flanges or end plates 36 extending downwardly therefrom. The flanges 36 may be right-angled with respect to the central plate 34; however, by constructing then as shown — at an angle somewhat less than 90° with the central plate — the anchor member will resist greater compressive forces than if the flanges were perpendicular to the central plate. For applications involving substantial forces, it has been found that flanges oriented at, say 80° with the central plate 34 withstand substantial forces.

The channel member 32 is preferably constructed of steel and defines an opening to receive elongated fastener members, preferably of the threaded type, such as bolts, screws, etc. In the preferred embodiment, a nut 38 having a central threaded opening is secured to the channel member by a suitable technique as by bonding, cementing, welding, etc. Alternatively, where the channel member is constructed of a material of sufficient thickness, the opening may be threaded to receive an elongated threaded member.

A channel member constructed of steel plate 0.050 inch or less is also capable of supporting the wall interaction forces contemplated in the preferred embodiment. However, with such relatively thin gauge metals, it is preferable to provide a threaded nut as shown for the reception of threaded fastener members. If desired, a threaded opening may be provided directly by a thinner metal plate as illustrated in the embodiment of FIGS. 17–21 and is best accomplished by dimpling an existing unthreaded opening and thereafter threading the dimpled portion as shown. In practice, this provides a tapered configuration of the threaded dimpled opening similar to a funnel, and this funnel-like configuration actually acts as a unique guide for an elongated threaded fastener when it is inserted blindly into a wall. The guide value of this configuration will be best appreciated by those who encountered difficulties with the prior art fasteners in properly inserting the threaded member into a blind environment.

The plate section 34 also defines two additional openings 40 which conveniently mate with attachment members 42 constructed integrally with legs 12 to secure the channel member in transverse relative position to the leg members as shown, for example, in FIGS. 10 and 11. The construction of the legs 12 and the anchor member 32 is such that when assembled, the central threaded opening 46 will be positioned generally medially of the legs 12 to receive a threaded fastener member therebetween.

Figure 3:
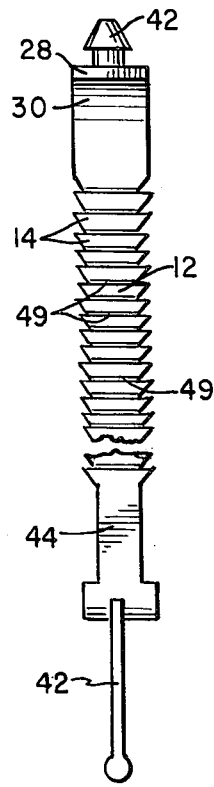
FIG. 3 is a side elevational view of the leg members thereof.

Referring further to FIGS. 1, 2 and 3, it should be emphasized that the attachment members 42 of the upper bent end portions 28 of the legs 12 are integral buttons of the same flexible resilient material as the leg members. These buttons define a centrally slotted tapered head as shown clearly in FIG. 2. When the tapered heads are inserted into openings 40 of central plate 34 of channel member 32, they snap into engagement therewith to retain the channel member in perpendicular relation to the legs 12.

Referring to FIGS. 1, 2 and 3, the lower end portions of the legs 12 are connected by a bridge 39, and gripping tab 42 is constructed integrally with the bridge 39 to provide firm control of the legs as will be described.

Figure 4:
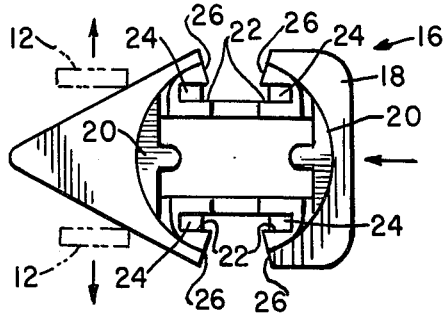
FIG. 4 is a top plan view of the collar member thereof.
Figure 6:
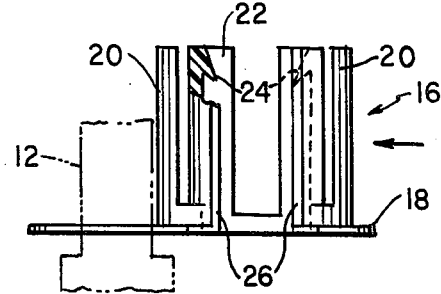
FIG. 6 is a perspective view thereof.

With the anchor member 32 secured to the end portions 28 of the legs 12, collar 16 is attached at the lower end portion of the legs 12 by spreading their lower straightedged sections 44 about the collar member 16 as shown in FIG. 4. The legs are guided along the tapered cammed edges of the tapered section 46 of base 18 until they enter the slots 22 through the tapered guide channels 26. In practice, it has been found that the resilient connection between leg members 12 and bridge 39 causes the leg members 12 to resist the spreading action of the tapered section 46 of base 18. Thus, when the legs 12 reach the guide channels 26, they automatically enter the slots 22 through the guide channels 26 due to the stabilizing resilient return forces of the legs. This return action is also caused by the fact that the base member 18 is greater in width than the space between the legs 12 as can be seen in FIG. 4.

With the legs 12 and collar 16 thus assembled, the collar 16 is slideable along the leg members, and the teeth 24 successively engage and disengage the teeth 14 of the legs. It will be observed that by configuring the teeth 24 of flange member 16 with an undercut lower portion at an acute angle with respect to the leg 2 — as shown in FIG. 5 — the collar is easily ratcheted toward the anchor member 32 while the undercut tooth configuration prevents movement of the flange member in the opposite direction.

The anchor assembly is conveniently utilized in wall openings dimensioned less than the length of the channel member 32 as shown in FIG. 7. Insertion of the channel member 32 into a wall opening is thus facilitated by rotation thereof to a generally parallel orientation with the legs 12 as shown in FIG. 7. When the channel member 32 clears the concealed surface of the wall, it is released and thereby automatically returns to its transverse position due particularly to the stabilizing forces provided by the resilient arcuate sections 30 of leg members 12. This stabilizing feature is particularly significant since direct control of the anchor member 32 is lost when it is released behind the hollow wall 48 shown in FIG. 7. Further, with the anchor member no longer in view, its orientation is readily known by observing the direction in which the tapered end portion of the base 18 of collar 16 is pointing, since the relative orientation of the anchor with the collar member is known.

The attachment of the anchor assembly is completed by sliding the collar 16 thus positioned about the leg members 12 as described such that a ratcheting engagement occurs between the teeth 14 and 24 which the flange member is moved toward the wall opening 50 shown in FIG. 7. When the collar 16 enters the wall opening 50 as shown in FIG. 8, for example, excess portions of the leg members 12 are easily removed as shown in that Fig. To facilitate quick removal of the excess leg portions, transverse notches 49 may be provided as shown in FIG. 9. These transverse notches may be conveniently spaced, as shown, at positions which correspond to the spacing of teeth 14 of legs 12 as shown. Thus, they provide convenient pre-dimensioned frangible break locations in the leg members. Further, to facilitate breakage of the leg members with still less break-resistance, the resilient plastic material of the leg members 12 may be formed of a polymerized monomer which may have a suitable contaminating agent such as talcum powder or the like, premixed with the monomer. Such "contamination" provides internal voids or discontinuities in the finished polymer which increase the frangibility of the material without materially adversely affecting its strength for the purposes intended. In practice, it has been found that either notches 49 or a contaminating agent in the plastic material is sufficient to render the legs sufficiently and readily frangible.

When the excess leg portions are broken away, the wall attachment is completed and is ready for supporting objects such as wall decorative items, lighting fixtures and the like. The portion 12a of the leg members 12, which remains within the wall 48, actually remains under a predetermined amount of tension due to the gripping action of the collar 16 and the restraining forces provided by the interaction of wall 48 on channel member 32 in the direction of the arrow "A" shown in FIG. 8.

A completed anchor assembly attached to a hollow wall 48 is illustrated in FIG. 10 in a manner which illustrates a significant feature of the invention. It is known that in plasterboard wall construction, often when the wallboard is drilled to provide an opening such as at 50, spalling of the wallboard will take place, causing chips of plaster or other material 52 to break off and relocate to a position adjacent the opening. For walls of cement, concrete, blocks, bricks and the like, similar obstructions are created by overflowed cement or by excess cement provided at the joints of the blocks or bricks, for example. These obstructions have provided numerous problems for prior art fasteners utilizing relatively elongated threaded anchor members because of the resulting asymmetry when one end of the anchor member engaged against the obstruction.

In the attachment illustrated in FIG. 10, a blind obstruction such as the exemplary chip 52 of plaster, cement and the like will not interfere with the orientation of the anchor member because of the relatively rigid — yet resilient — construction of the assembly. Thus, when the anchor member 32 is moved toward the wall, it will stop at the first engagement with any obstruction such as the chip 52 and retain the desired perpendicular relation between the axis of the threaded portion and the wall as shown in FIG. 10. In this manner, the anchor member is positioned to receive the threaded fastener member 54. It has been found that the dual legged construction — coupled with the resilience of the material as well as the toothed collar 16 — form a relatively rigid and stable structure within the wall opening.

Another significant feature of the present construction is illustrated by the "trapezoidal blind force control path" shown in dotted lines in FIG. 2. Referring to the fastening procedure described hereinabove, it will be seen that once the anchor member 32 is released behind a blind wall portion, control of the orientation of the anchor member is relatively reduced, and direct control is eliminated. When the anchor member 32 is actually released, control of the entire anchor assembly is provided by gripping tab 42 and by providing control forces longitudinally of the leg members 12 either by rotating the gripping tab, or by subjecting the leg members to direct longitudinal forces in the direction of arrows "B" shown in FIG. 2. In either case, the objective is to provide such forces longitudinally of the leg members to control the position and orientation of the channel member 32 when it is behind the blind surface of the hollow wall.

It is clear that dual legs 12, combined with the generally elongated transverse channel member 32 and collar member 16, facilitate a suitable force distribution on the wall panel surrounding an opening for attaching objects to hollow walls in a manner that even hollow walls constructed of wallboard materials as thin as ⅜ inch or less, are capable of supporting wall-hung objects of significant weight. Furthermore, the unique combination of resilience and rigidity renders it more useful with relatively solid plaster walls than the prior art fasteners which were used with those constructions.

Referring now to FIG. 11, an alternate form of the inventive anchor assembly is shown wherein leg members 58 have a single series of teeth 60, and collar member 62 is provided with a single mating tooth 64 for each leg member. This arrangement illustrates optional notched portions 66 which provide convenient break sections in a manner similar to the transverse notches 49 of the arrangement of FIG. 1. These break sections increase the frangibility of the legs at locations preferably corresponding to the teeth 60. In practice, it has been found that the single ratcheting tooth arrangement of FIG. 11 will provide substantial forces and wall-gripping capability to secure objects to hollow walls.

A second embodiment of the inventive anchor assembly is illustrated in FIGS. 12-16. Referring initially to FIG. 12, a blind anchor assembly 70 is comprised of parallel legs 72 having upper end portions 74 connected to the legs 72 by arcuate resilient sections 76 similar to the construction of the first embodiment. Fastener buttons 78 preferably constructed of the same resilient flexible plastic material as the leg members are identical to the fastener buttons of the first embodiment and have a centrally slotted conical head configuration for snapped engagement into openings 82 defined by transverse anchor member 80. The transverse anchor member 80 is of steel construction and substantially identical to the anchor member described in connection with the embodiment of FIGS. 1-11. Accordingly, a threaded nut 84 is suitably secured — as by welding — to the anchor member 80 adjacent an opening in the anchor member. The opening is positioned generally medially of the legs 72 when they are assembled with the anchor member 80. The nut 85 may be cemented, glued, welded or otherwise suitably attached to anchor member 80 in a manner similar to that disclosed in connection with the embodiment of FIG. 1.

Referring further to FIG. 12, legs 72 define a series of adjacent stepped portions 86 on the inside surfaces thereof so as to face each other as shown. A connecting bridge 88 is provided at the lower end portion of the leg members, and a pull tab 90 is connected to the bridge 88 as shown.

Collar 92 — which functions similarly to the collar 16 of the first embodiment — is also somewhat similarly constructed; however, the flange structure differs from that of the first embodiment to mate with leg 72 as will become evident in the description. The collar 92 has a relatively planar base 94 with a tapered end portion 96 and an upstanding flange 91 which defines at least two slots 98 configured to receive portions of the legs therein.

The flange 91 of collar 92 is partially broken away to illustrate an internal tooth 100 shown in FIG. 16 on one side only. An identical tooth 100 is positioned within the oppositely positioned slot 98, and both teeth are configured to be engageable with the corresponding teeth 86 of the legs 72 with a ratchet-like action when the legs 72 and collar 92 are assembled as in FIG. 15 (with leg members 72 positioned within slots 98) and the collar 92 is moved therealong toward a wall opening.

A wall portion 102 defines an opening 104 as shown in FIG. 14, which is dimensioned less than the length of the anchor member 80. Insertion of the anchor member 80 into wall opening 104 is facilitated by rotating the anchor member to a generally parallel relation with the leg members 72 as shown in FIG. 14. Upon clearing the inner blind surface 106 of the hollow wall, the anchor member 80 is released, whereupon the resilient flexible arcuate portions connecting the upper end portions of the legs 74 to the main leg portions 72 provide resilient stabilizing forces which return the anchor member to its transverse position relative to the legs 72. At this point, the gripping member 90 is gripped, and the entire assembly is shifted in the direction of arrow "A" in FIG. 15 until the anchor channel 80 engages the blind surface 106 of the wall 102 as shown in FIG. 15.

With the anchor member 80 engaged against the concealed surface 106 of wall 102, the collar 92 is moved toward the wall opening 104 in the direction of arrows "B" shown in FIG. 15. Thus, as the collar 92 is moved in this direction, the teeth 100 within slots 98 successively engage and disengage the correspondingly configured mating teeth 86 of the legs 72, and collar 92 is free to move in a generally unidirectional manner, i.e., toward the wall opening 104 as shown in FIG. 15. Thus, the configuration of teeth members 86 is such that forces tending to move collar 92 away from the wall opening are resisted due to their engagement with teeth 100 on the collar. Assembly and removal of collar 92 with leg members 72 is as shown in FIG. 12 in the direction of arrow "C".

When the collar 92 engages the wall 102, flange 91 is received within the opening 104, and base member 94 will engage the outer surface of the wall. At this point, the excess portions of the leg members extending outwardly of the wall are broken away in a manner similar to the procedure described for the first embodiment.

Referring to FIG. 12, the vertical dimension "D" between teeth 100 and base 96 of the collar 92 is equal to the pitch between the teeth 86 of leg members 72. Thus, when the collar 92 and legs 72 are assembled within a wall portion and the opposed teeth of the respective members are in engagement, excess leg portions extending from the wall may be broken at a minimum cross-section as represented by dimension "E" in FIG. 15. This facilitates convenient breakage of the excess portions of the leg member, and the undercut configuration of the teeth 86 of the leg members provides such frangible capability. In addition, it should be noted that where the flexible resilient plastic material is a polymerized monomer such as polypropylene, polyethylene, nylon or the like, frangibility of the leg members 72 may also be improved by the addition of a suitable contaminant such as talcum powder or the like to the monomer prior to polymerization as described with reference to the first embodiment. Completion of the attachment is accomplished by fastening a wall decorative object 108 or the like by an elongated threaded screw 110 as shown in FIG. 16.

Referring now to FIGS. 17-20, a third embodiment of the invention is illustrated. A first member 110 is constructed of the same flexible plastic materials as the corresponding member of the earlier embodiments and comprises a pair of generally parallel leg members 112 connected by an integral collar 110. The collar 110 is comprised of a generally planar base 114 having a generally circular configuration and a flange 116 upstanding therefrom and integral with the leg members 112. The leg members are configured at their upper end portions similarly to the configuration of the previous embodiments.

Anchor member 124 of steel construction is positioned transversely of the leg members 112 and is attached thereto by tabs 118 which are engageably received within side openings 119 as shown. Engageable reception of the tabs is provided by the external dimension "F" shown from tab to tab (shown in FIG. 18) being greater than the inside dimension "G" of anchor member 124.

The components of the anchor fastener are assembled as shown in FIG. 17 in preparation for attachment to a hollow wall. The attachment operation is accomplished similarly to the previous embodiments and particularly by rotating the anchor member so as to be parallel with the leg members as shown in FIG. 19. This procedure permits insertion of the channel member into the wall portion as shown.

When the anchor member 124 is positioned behind the concealed surface of the wall portion, the anchor member is drawn into engagement with the blind surface of the wall by threaded insertion of an elongated threaded member 121 as shown in FIG. 20. In this embodiment, the anchor member 124 advances along the screw 121 and moves toward the blind surface 123 of wall portion 125. Legs 112, thus being flexible, assume the flexed configuration shown in FIG. 20 while the fastener assembly retains object 127 in attachment with the hollow wall. Thus, removal of leg portions as described in the previous embodiments is eliminated.

Referring now to FIG. 21, there is illustrated an alternate feature which is contemplated for use with the third embodiment of the invention, whereby a separate collar 130 slideably receives generally parallel legs 132 in a manner somewhat similar to the previous embodiments but without the ratcheting teeth described in connection with the previous embodiments. This optional feature is relatively economical as compared to the previous embodiments. In operation, the installation procedure is similar to that previously described. Gripping tab 134 is grasped and the legs 132 are moved outwardly away from the wall until the channel members engages the blind inner surface of the wall as shown. At this stage, an elongated threaded fastener is inserted in a manner similar to the previous embodiment, and the excess portion of the leg members may be broken away as previously described.

It should be understood that the "trapezoidal blind force control path" of the embodiment of FIGS. 1-11 is also advantageously available with the embodiments of FIGS. 12-21. Also, it should be noted that in connection will all of the embodiments described herein, alternate features may be interchanged from embodiment to embodiment, and equivalent alternatives may be incorporated in place of those described in the preferred form.

We claim:

1. An anchor assembly for retaining an elongated fastener member within an opening defined by a wall portion having at least one concealed side which comprises:
    a. at least two elongated leg members of flexible material positioned in generally parallel relation;
    b. means connecting a pair of adjacent end portions of said leg members;
    c. a generally elongated anchor member positioned transversely of the leg members at the opposite end portions thereof and defining an opening generally medial of the leg members capable of receiving an elongated fastener member positioned between the leg members for attachment to the anchor member;
    d. means to connect an end portion of each leg member to said anchor member, at least said end portion thereby connected being generally transversely oriented relative to said leg members and at least portions of said leg members adjacent said connected portions being resilient and angularly oriented relative to the major portion of the associated leg member to bias said anchor member toward its transverse position relative to said leg members against forces which tend to rotate said anchor member toward a generally parallel orientation with said leg members, and control of the orientation and position of said anchor member behind a concealed wall portion is facilitated by said leg members; and
    e. a collar member of a resilient material configured to be at least partially received within the wall portion opening and having at least one flange member extending outwardly therefrom in a direction generally transverse of its axis, and defining at least two openings for reception of said leg members and having means correspondingly positioned, configured, and dimensioned to engageably mate with said leg members to restrict movement of said collar member relative to said leg members when said leg members are positioned within said openings to facilitate selective positioning of said collar member along said leg members and to selectively permit gripping of wall portions of several thickness between said anchor member and said collar member while said flange member engages at least a surface portion of said wall portion adjacent the wall portion opening to prevent said collar member from entering the wall portion opening, said collar member defining at least one opening substantially aligned with said anchor member opening for reception of an elongated fastener member positioned between said leg members.

2. An anchor assembly for retaining an elongated fastener member within an opening defined by a wall portion having at least one concealed side which comprises:
    a. at least two elongated leg members of flexible material positioned in generally parallel relation and having ratchet means positioned along at least a portion of their length;
    b. means connecting a pair of adjacent end portions of said leg members;
    c. a generally elongated anchor member positioned transversely of the leg members at the opposite end portions thereof and defining an opening generally medial of the leg members capable of receiving an elongated fastener member positioned betwen the leg members for attachment to the anchor member;
    d. means to connect an end portion of each leg member to said anchor member, at least said end portion thereby connected being generally transversely oriented relative to said leg members and at least portions of said leg members adjacent said connected portions being resilient and angularly oriented relative to the major portion of the associated leg member to bias said anchor member toward its transverse position relative to said leg members against forces which tend to rotate said anchor member toward a generally parallel orientation with said leg members, and control of the orientation and position of said anchor member behind a concealed wall portion is facilitated by said leg members; and
    e. a collar member of a resilient material configured for reception into the wall portion opening and having at least one flange member extending outwardly therefrom in a direction generally transverse of its axis and defining at least two openings for reception of said leg members and having ratchet means correspondingly positioned, configured, and dimensioned to engageably mate with said ratchet means of said leg members when said leg members are positioned within said collar member openings to permit movement of said collar member relative to said leg members in a direction toward said anchor member while mating ratchet means resiliently progressively engage and disengage and relatively prevent movement of said collar member in the opposite direction thereby selectively permitting gripping wall portions of several thickness between said anchor member and said collar member, while said flange member engages at least a surface portion of the wall portion adjacent the wall portion opening to prevent said collar member from entering the wall portion opening, said collar member defining at least one opening substantially aligned with said anchor member opening for reception of an elongated fastener member positioned between said leg members.

3. The anchor assembly according to claim 1 further comprising a collar member defining slotted openings configured to accept said leg members therein.

4. The anchor assembly according to claim 2 wherein said ratchet means on said collar member comprises teeth members engageable with corresponding mating teeth members on said leg members.

5. The anchor assembly according to claim 4 wherein said leg members comprise generally elongated strips of flexible resilient plastic having a plurality of successive generally triangular-shaped teeth members extending along at least a portion thereof.

6. The anchor assembly according to claim 4 wherein said leg members comprise generally elongated strips of flexible resilient plastic material having a plurality of successive generally triangular-shaped teeth members extending along at least a portion of at least one marginal edge portion.

7. The anchor assembly according to claim 6 further comprising gripping means secured to said connected end portions of said leg members for applying forces to said leg members capable of controlling the orientation and position of said anchor member when positioned behind the blind surface of a hollow wall portion.

8. The anchor assembly according to claim 7 wherein the end portions of said leg members connected to said anchor member are configured at right angles to the major portion of said leg members.

9. The anchor assembly according to claim 8 further comprising fastening means attached to said approximately right angled end portions of said leg members configured to be engageably received within the openings defined by said anchor member so as to position the generally central opening of said anchor member generally medially of said leg members.

10. The anchor assembly according to claim 9, wherein said generally central opening of said anchor member is capable of threadedly receiving a threaded elongated fastener member.

11. The anchor assembly according to claim 10 wherein said anchor member has a threaded member secured thereto adjacent said opening so as to receive an elongated threaded fastener member therein.

12. The anchor assembly according to claim 6, wherein said triangular-shaped teeth members extend along opposed inner surface portions of said leg members and said openings of said collar member for reception of said leg members have a generally slotted configuration, each including at least one tooth member positioned, configured and dimensioned to engageably mate with said triangular-shaped teeth members on said leg members to permit movement of said collar member along said leg members toward said anchor member and prevent movement of said collar member in the opposite direction to selectively permit gripping wall portions of several thicknesses between said anchor member and said collar member, while selectively tensioning the portions of said leg members within said wall portion opening.

13. The anchor assembly according to claim 11 wherein two opposed marginal edge portions of each leg member define a plurality of generally undulating triangular-shaped teeth formed by a series of alternate triangular notches, said teeth being configured to be engageably mated with correspondingly configured teeth positioned within the slotted portions defined by said collar member.

14. The anchor assembly according to claim 13 wherein each opening of said collar member for reception of said leg members contains a tooth of generally triangular configuration positioned and configured so as to be capable of engageably ratcheting over the corresponding series of mating teeth of the leg members when the collar is moved in one direction therealong, but capable of preventing movement of the collar member in the opposite direction along the leg members.

15. The anchor assembly according to claim 14 further comprising a plurality of generally transversely positioned notched portions on said leg members defining selective break locations of said leg members when the anchor assembly is positioned and assembled within an opening defined by a hollow wall portion.

16. The anchor assembly according to claim 15 wherein said means to secure the leg members to said anchor member comprises at least two generally tapered button fasteners defining generally central slots and dimensioned to be engageably received within corresponding openings defined by said anchor member, the openings defined by said anchor member being less than the maximum width of said tapered buttons to securely attach the anchor member thereto.

17. The anchor assembly according to claim 16 wherein said collar is comprised of a generally planar base member having at least one tapered configuration on one side, and an integral flange upstanding therefrom having separate portions resiliently secured to said base member and defining slotted portions capable of receiving the leg members.

18. The anchor assembly according to claim 17 wherein said collar member has at least one triangular tooth positioned for successive engagement with the correspondingly configured teeth positioned along at least one marginal opposite edge portion of each leg member, and the resilient flexible movement of the upstanding flange portions relative to said base member provide movements of the teeth members in each slot which permit convenient successive engagement and disengagement of the mating teeth, the configuration of the mating teeth being such as to prevent movement in the opposite direction.

19. The anchor assembly according to claim 18 wherein said leg members define a plurality of transversely extending slotted portions corresponding to each tooth so as to render said leg member relatively frangible at said slotted locations and said anchor member is comprised of a generally elongated channel member.

20. The anchor assembly according to claim 19 wherein said generally elongated channel member is of steel construction.

21. The anchor assembly according to claim 20 wherein said generally central opening of said channel member is threaded to receive a generally elongated threaded fastener member.

22. The anchor assembly according to claim 21 wherein said channel member is constructed of a central plate section having plate members extending upwardly therefrom and defining at least one of a generally acute angle and an approximately right angle therewith to provide sufficient compressive force-carrying capability to said anchor member, and said central plate section defines an opening generally medial of the leg members having a threaded nut positioned for threaded reception of an elongated threaded positioned between the leg members for attachment to said channel member.

23. The anchor assembly according to claim 21 wherein the central opening defined by said channel member is a funnel-shaped opening portion defining generally spirally configured threads therein.

24. The anchor assembly according to claim 23 wherein said leg members are comprised of a polymerized monomer having a contaminating agent such as talcum powder therein to enhance the frangibility of said leg members so as to render excess portions thereof breakable away from the portion of the leg members positioned within the wall opening when said anchor assembly is secured to a wall portion.

25. The anchor assembly according to claim 3 wherein said leg members have a plurality of generally triangular-shaped successive teeth members positioned along at least one marginal edge portion and a plurality of notches defined along said opposite marginal edge portion to render the leg members relatively frangible at predetermined positions therealong, and said collar member openings for reception of said leg members comprise slotted portions defined by said collar member configured to receive said leg members therein, each of said slotted portions having positioned therein on one side, a tooth configured to successively engage the teeth members of said leg members as the collar member is moved toward the anchor member, the teeth members of the collar member and teeth members of the leg members being configured to engage in locked relation when the collar is moved in the opposite direction along the leg members.

26. The anchor assembly according to claim 3 further comprising a collar member defining two slotted openings configured to receive said leg members and an outwardly extending tooth member on oppositely positioned wall portions adjacent said slots and said leg members define a plurality of generally triangular-shaped teeth members facing inwardly toward each other and capable of being engaged in mating relation with the teeth members of said collar member such that positioning the collar member about said leg members and advancing the collar member toward the anchor member results in unidirectional ratcheting engagement between the teeth members of the collar and the mating teeth members of the leg members but engagement of the respective teeth members prevents movement of the collar member in the direction away from said anchor member, said teeth members on said leg members being dimensioned to permit selective gripping of wall portions of several thicknesses while tensioning the portions of said leg members within the wall portion opening, said leg members being sufficiently frangible to permit breakage of excess leg portions extending outwardly from said wall portions and said collar member while said leg portions within said wall portion opening are maintained in tension.

27. An anchor assembly for retaining an elongated fastener member within an opening defined by a wall portion having at least one concealed side which comprises:
  a. at least two elongated leg members comprised of strips of flexible resilient synthetic plastic material positioned in generally parallel relation and having ratchet means in the form of a plurality of adjacent teeth members positioned along inner opposed surface portions thereof;
  b. means to connect a pair of adjacent end portions of said leg members and having gripping means connected thereto;
  c. a generally elongated anchor member positioned transversely of said leg members at the opposite end portions thereof and defining an opening generally medial of said leg members capable of threadedly receiving an elongated threaded fastener member positioned between the leg members.
  d. means to connect an end portion of each leg member to said anchor member, at least said end portion thereby connected being generally transversely oriented relative to said leg members and connected to the major portions of said leg members by resilient arcuate portions thereof which bias anchor member which bias said anchor member toward its transverse position relative to said leg members against forces which tend to rotate said anchor member toward a generally parallel orientation with said leg members, and control of the orientation and position of said anchor member behind a concealed wall portion is facilitated by said leg members; and
  e. a collar member of resilient synthetic plastic material configured for reception into the wall portion opening and having at least one flange member extending outwardly therefrom about a major circumferential portion thereof in a direction generally transverse of its axis and defining at least two openings for reception of said leg members and having ratchet means in the form of at least one tooth member correspondingly positioned, configured, and dimensioned to engageably mate with said ratchet means of said leg members when said leg members are positioned within said collar member openings to permit movement of said collar member relative to said leg members in a direction toward said anchor member, while said mating ratchet means resiliently progressively engage and disengage and prevent movement of said collar member in the opposite direction, thereby selectively permitting gripping wall portions of several thicknesses between said anchor member and said collar member, while said flange member engages a surface portion of the wall portion adjacent the wall portion opening to prevent said collar member from entering the wall portion opening, said mating ratchet means being dimensioned to provide selective engagement thereof to tension the portions of said leg members within said collar portion opening, said collar member defining at least one opening substantially aligned with said anchor member opening for reception of the elongated threaded fastener member when positioned between said leg members.

28. An anchor assembly for retaining an elongated fastener member within an opening defined by a wall portion having at least one concealed side which comprises:
  a. at least two elongated leg members of flexible, resilient synthetic plastic material positioned in generally parallel relation;
  b. a collar member secured to the opposite end portions of said leg members so as to connect said leg members in spaced relation, said collar member being configured to be received within the opening defined by the wall portion and having a flange member extending transversely of its axis to prevent said collar member from entering the wall opening, said collar member having a generally central opening for reception of an elongated fastener member and said leg members being spaced to guide an elongated fastener member inserted into said collar member;
  c. a generally elongated anchor member having a channel-like cross-sectional configuration positioned transversely of the leg members at the opposite end portions threeof and defining an opening generally medial of the leg members and capable of receiving an elongated threaded fastener member positioned between the leg members;
  d. means to connect an end portion of each leg member to said anchor member, at least said end portion thereby connected being generally transversely oriented relative to said leg members and the portion connecting said transverse connected end portions with the major parallel portions of said leg members being resilient and geneally arcuate so as to bias said anchor member toward its transverse position relative to said leg members against forces which tend to rotate the anchor member toward a generally parallel orientation with said leg members, and control of the orientation and position of said anchor member behind a concealed wall portion is facilitated by said leg members, and the resilient flexibility of said leg members being such that said anchor member in insertable into a wall opening dimensioned less than its length by rotating said anchor member so as to be generally parallel with said leg members and inserting the anchor member and connected portions of said leg members into said wall opening, said anchor member being automatically returnable to its generally transverse position relative to said leg members positioned behind the wall portion and insertion of an elongated threaded fastener member into the central opening of said collar member so as to be guided by the portions of said leg members within said wall portion opening, and threadedly advancing said fastener member into the central opening of said anchor member causes said anchor member to advance toward the concealed side of the wall portion while the leg members resiliently flex between the anchor member and the concealed surface portion of the wall portion, with the flexed portions of said leg members being at least partially captivated within said channel-like another member, said anchor member and said threaded fastener member thus being capable of securing an object to the forward side of the wall portion.

29. An anchor assembly for retaining an elongated fastener member within an opening defined by a hollow wall having at least one concealed side which comprises:
  a. at least two elongated molded plastic resilient leg members positioned in generally parallel relation and defining a series of stepped portions along at least a portion of their length on inner opposed facing surfaces;
  b. an integrally molded bridge portion connecting a pair of opposed adjacent end portions of said leg members;
  c. a gripping tab integrally molded with said leg members and said bridge portion;
  d. a generally elongated anchor member positioned transversely of the leg members at the opposite end portions thereof and having a plate section and two flange members extending perpendicularly therefrom to form a channel-like cross-sectional configuration, said anchor member defining an opening generally medial of the leg members and capable of threadedly receiving a threaded elongated fastener positioned between the leg members;
  e. means integrally molded with said leg members to connect an end portion of each leg member to plate section of said anchor member, at least said end portion thereby connected being generally transversely oriented relative to said leg members and at least the portion of each leg member connecting each connected end portion to the major portion of each leg member being arcuate and resilient so as to bias said anchor member toward its transverse position relative to said leg members against forces which tend to rotate said anchor member to a generally parallel orientation with said leg members, and control of the orientation and position of said anchor member behind a concealed wall portion may be facilitated at least by forces applied to said gripping tab; and
  f. a collar member of a resilient molded plastic material configured for reception into the wall portion opening and having at least one flange member extending outwardly therefrom in a direction generally transverse of its axis and defining at least two openings for reception of said leg members and having at least one stepped portion correspondingly positioned, configured and dimensioned to engageably mate with said stepped portions of said leg members when said leg members are positioned within said collar member openings to permit ratcheting movement of said collar member relative to said leg members in a direction toward said anchor member while said mating stepped portions resiliently progressively engage and disengage and prevent movement of said collar member in the opposite direction, said stepped portions of said leg members and collar member further being dimensioned to permit tensioning of portions of said leg members within the wall portion opening so as to facilitate gripping wall portions of several thicknesses between said anchor member and said collar member while said flange member engages at least a surface portion of the wall adjacent the wall portion opening to prevent said collar member from entering the wall portion opening, said collar member defining at least one opening aligned with said anchor member opening for reception and positioning of the elongated fastener between said leg members.

30. An anchor assembly for retaining an elongated fastener member within an opening defined by a wall portion having at least one concealed side which comprises:
  a. at least two elongated strips of flexible resilient plastic having a plurality of successive generally triangular-shaped teeth members extending along at least a portion of at least one marginal edge portion;
  b. means connecting a pair of adjacent end portions of said leg members;
  c. a generally elongated anchor member positioned transversely of said leg members at the opposite end portions thereof and defining an opening generally medial of said leg members capable of receiving an elongated fastener member positioned beteen said leg members for attachment to the anchor member;
  d. fastening means to connect an end portion of each leg member to said anchor member, said connected end portions of said leg members being approximately perpendicular to said leg members, said fastening means being attached to said perpendicular portions of said leg members and configured to be engageably received within openings defined by said anchor member so as to position the fastener opening of said anchor member generally medial of said leg members;
  e. gripping means secured to said connected end portions of said leg members for applying forcs to said leg members capable of controlling the orientation and position of said anchor member when positioned behind the blind surface of a wall portion; and
  f. a collar member defining slotted portions configured to accept said leg members and having teeth members engageable with corresponding teeth members of said leg members in a manner to selectively fix the position of said collar member at a plurality of positions along the length of the leg members.

* * * * *

UNITED STATES PATENT AND TRADEMARK OFFICE
CERTIFICATE OF CORRECTION

PATENT NO. : 4,075,924
DATED : February 28, 1978
INVENTOR(S) : Thomas W. McSherry and Allan Thaw It is certified that error appears in the above—identified patent and that said Letters Patent are hereby corrected as shown below:

Column 2, line 29, "to one end" should read -- at one end --

Column 2, line 43, "Gekpcke" should read -- Gelpcke --

Column 2, lines 53-59, the use of bold print is an error.

Column 4, line 28, "agreement which renders" should read -- arrangement which renders --

Column 6, lines 44-45, "SHEETROCK $^{200}$" should read -- SHEETROCK ® --

Column 8, line 37, "the leg 2" should read -- the leg 12 --

Column 8, line 64, "which the" should read -- while the --

Column 10, line 55, "The nut 85" should read -- The nut 84 --

Column 12, line 67, "will all of" should read -- with all of --

Column 13, lines 46-47 (lines 43-44 of Claim 1), "of several thickness" should read -- of several thicknesses --

UNITED STATES PATENT AND TRADEMARK OFFICE
CERTIFICATE OF CORRECTION

PATENT NO. : 4,075,924
DATED : February 28, 1978
INVENTOR(S) : Thomas W. McSherry and Allan Thaw It is certified that error appears in the above-identified patent and that said Letters Patent are hereby corrected as shown below:

Column 14, line 36 (line 49 of Claim 2),
"thickness between said" should read -- thicknesses between said --

Column 16, line 43 (line 10 of Claim 22),
"threaded positioned" should read -- threaded fastener positioned --

Column 17, line 19 (line 13 of Claim 26),
"of the collar and" should read -- of the collar member and -

Column 17, lines 56-57 (lines 25-26 of Claim 27),
after "portions thereof" and before "which bias said" delete "which bias anchor member"

Column 18, line 51 (line 23 of Claim 28),
"portions threeof" should read -- portions thereof --

Column 18, line 61 (line 33 of Claim 28)
"and geneally arcuate" should read -- and generally arcuate --

Column 19, line 22 (line 62 of Claim 28)
"said channel-like another" should read -- said channel-like anchor --

Column 20, lines 42-43 (lines 16-17 of Claim 30)
"positioned beteen said" should read -- positioned between said --

UNITED STATES PATENT AND TRADEMARK OFFICE
CERTIFICATE OF CORRECTION

PATENT NO. : 4,075,924
DATED : February 28, 1978
INVENTOR(S) : Thomas W. McSherry and Allan Thaw It is certified that error appears in the above-identified patent and that said Letters Patent are hereby corrected as shown below:

Column 20, line 56 (line 30 of Claim 30),
"for applying forcs" should read -- for applying forces --

Signed and Sealed this

Sixth Day of June 1978

[SEAL]

Attest:

RUTH C. MASON
*Attesting Officer*

DONALD W. BANNER
*Commissioner of Patents and Trademarks*